Figure 1:
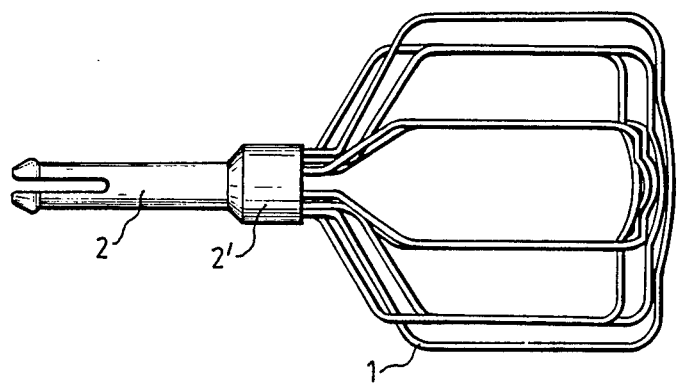

United States Patent [19]
Haas et al.

[11] Patent Number: 4,730,939
[45] Date of Patent: Mar. 15, 1988

[54] MIXING AND WHIPPING WHISK

[75] Inventors: Michael Haas, Kronberg/Ts.; Hagen Reker, Eschborn, both of Fed. Rep. of Germany

[73] Assignee: Braun Aktiengesellschaft, Frankfurt, Fed. Rep. of Germany

[21] Appl. No.: 909,780

[22] Filed: Sep. 19, 1986

[30] Foreign Application Priority Data

Sep. 23, 1985 [DE] Fed. Rep. of Germany ....... 3533834

[51] Int. Cl.[4] .............................................. B01F 7/32
[52] U.S. Cl. .................................................. 366/342
[58] Field of Search ................ 366/342, 343, 129, 67, 366/279, 348, 349, 326; 15/141 A, 92

[56] References Cited

U.S. PATENT DOCUMENTS

| 871,247 | 11/1907 | Tomlinson | 366/343 |
| 884,085 | 4/1908 | Genge | 366/343 |
| 1,287,741 | 12/1918 | Pinkney | 366/343 |
| 1,785,563 | 12/1930 | Schiff | 366/326 |

FOREIGN PATENT DOCUMENTS

| 61389 | 9/1918 | Fed. Rep. of Germany . |
| 467024 | 10/1928 | Fed. Rep. of Germany . |
| 1454027 | 11/1968 | Fed. Rep. of Germany . |
| 2423910 | 11/1975 | Fed. Rep. of Germany . |

Primary Examiner—Robert W. Jenkins

[57] ABSTRACT

The disclosed mixing and whipping whisk is composed of a drive shaft, a number of coil wires and a plug-shaped clamping element which permits the coiled wires to be secured to the drive shaft by a simple clip action in a tension-proof and anti-torsion manner.

11 Claims, 6 Drawing Figures

MIXING AND WHIPPING WHISK

The present invention relates to a mixing and whipping whisk.

A like implement is known from German published patent application No. 24 23 910. Besides, German published patent application No. 14 54 027 describes a manually usable whipping whisk, the free ends of whose coiled wires are plugged into concentrically arranged holes of a mounting head furnished with a centric threaded bore, the said mounting head being inserted into an indentation at the frontal end of the handle and being retained there by means of a screw which is inserted from rearwards into the handle and penetrates the latter.

In contrast to another commonly used design variant which is made by positioning and extrusion-coating of the coiled wires in an injection moulding machine, the whisks known from the above-mentioned publications permit to be finally assembled independently of the injection moulding machine and its station times. However, so far, this advantage in manufacture could not prove its beneficial effects, since - for design reasons the final assembly necessitated rather great expenditure and hardly lent itself to automation.

It is the object of the present invention to reduce the number of individual components necessary for completing such mixing and whipping whisks and to create by design measures the preconditions for the final assembly to be all in all performed by automatic fabrication and to thus minimize the production time and the total manufacturing costs.

In the mixing and whipping whisk according to the instant invention which is particularly destined for mixing machines, the drive shaft is at its end remote from the drive motor provided with a mounting head containing a frontally shaped-in indentation in which the ends of the individual coiled wires are retained by virtue of a simple self-clamping plug-shaped clamping element. The whisk to be fabricated hence is composed of only three different components, namely, to begin with, of the coiled wires which principally can be employed in any number and shape whatsoever, besides, of the drive shaft with its mounting head shaped and designed as a mounting element and, finally, of the plug-shaped clamping element which is designed as a clip member.

Since the coiled wires are anchored in the longitudinal grooves formed in the inner wall of the mounting head and thus directly at a part of the drive shaft, the torque of the drive is transmitted onto the coiled wires directly, that means any glued or welded joints are avoided. In a preferred improvement of the subject matter of this invention, the said longitudinal grooves are supplemented by radial grooves which likewise are shaped into the mounting head and into which rectangular extensions of the coiled wire ends are pressed with the aid of the plug-shaped clamping element. As a result, the coiled wires are not only fixed in position against forces acting in the axial direction, but are likewise protected against torsional forces which might cause twisting of the coiled wires in themselves. In this arrangement, the indentation in the mounting head and, correspondingly, also the plug-shaped clamping element are preferably of cylindrical configuration.

The self-clamping fixation of the clamping element in the mounting head and thus the securing-in-position of the coiled wires even when exposed to maximum stress is advantaeously accomplished in that an annular groove is shaped into the wall of the indentation, into which groove an annular bead shaped at the clamping element is engaging. Accordingly, vice-versa, likewise the indentation can be provided with an annular bead and the clamping element with an annular groove.

To simplify the automatic assembly and also the warehousing, it is favourable to equip the inventive mixing and whipping whisk with coiled wires of identical shape and size and to have their two ends fixed in each case in diametral grooves in the mounting head. Especially in this embodiment, as the end portions of the coiled wires extend differently far into the indentation of the mounting head due to their mid-portions crossing over one another, the bottom of the indentation and, correspondingly likewise the end surface of the clamping element projecting into the indentation preferably are two times stepped like winding stairs in such a fashion that two diametral steps each are arranged in alignment with one another on the same axial level, while the radial grooves are formed into the steps of the indentation and the step height corresponds approximately to the thickness of wire of the coiled wires. Owing thereto, the coiled wires are positioned correspondingly axially stepped and are fixedly clamped.

To simplify the assembly when inserting the coiled wires and when plugging in the clamping element, it is expedient to provide a concentric guide pin in the indentation of the mounting head, which pin extends to fit into a corresponding concentric recess of the clamping element.

The inventive constructive design of the proposed mixing and whipping whisk facilitates said's assembly and makes it a simple plug-in and clip action which can be easily carried out by an automatic machine. That means, the speed of the final manufacturing stage is completely independent of the specific station times of the injection moulding machines used for the fabrication of the individual component parts and is not delayed by any gluing, welding or screwing measures either.

The attached drawings illustrate the present invention by way of an embodiment. In the drawings, FIG. 1 is the side view of a completed mixing and whipping whisk according to the present invention, FIG. 2 is a single coiled wire, FIG. 3a is a partial longitudinal cross-sectional view of the mounting head of the mixing and whipping whisk, FIG. 3b is an axial topview of the mounting head according to FIG. 3a, FIG. 4a is the side view of a clamping element for a mounting head according to FIGS. 3a and 3b, FIG. 4b is an axial topview of the clamping element according to FIG. 4a.

Figure 2:
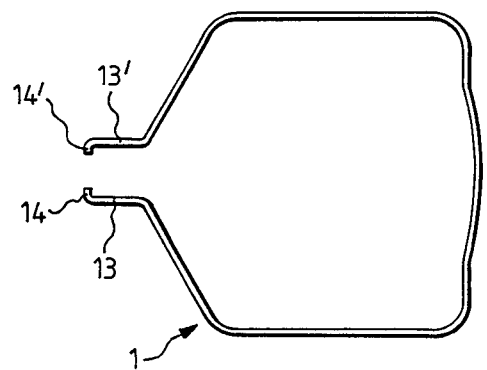

As is shown in FIG. 1, the inventive mixing and whipping whisk comprises a drive shaft 2 with a mounting head 2' shaped thereto and a number of coiled wires 1 secured in this mounting head 2'. In the embodiment illustrated—as is discernible from FIG. 2—the coiled wires 1 have paraxial end portions 13 and 13' which preferably end in roughly rectangular extensions 14 and 14'.

Figure 3A:
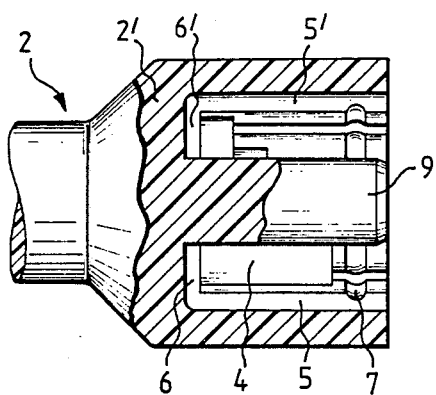
Figure 3B:
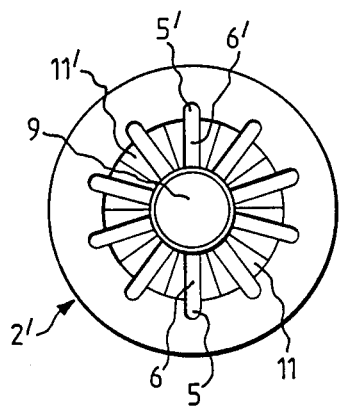
Figure 4A:
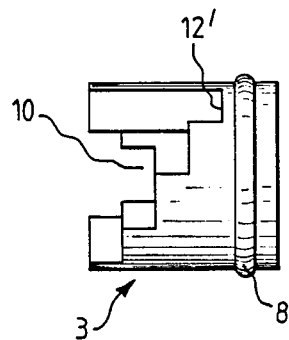
Figure 4B:
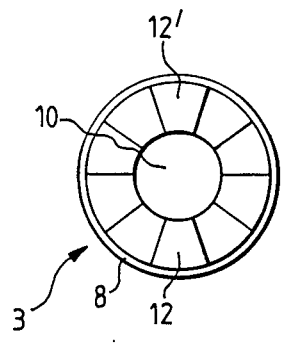

The enlarged illustrations of the mounting head in FIGS. 3a and 3b and of the plug-shaped clamping element in FIGS. 4a and 4b show their constructive details. Hence follows, the mounting head 2' contains a number of pairs of diametral longitudinal grooves 5, 5' to accommodate the coiled-wire end portions 13, 13', the number of grooves corresponding to the number of coiled wires provided, and contains as well pairs of radial grooves 6, 6' to accommodate the rectangular extensions 14 and 14' of the coiled-wire end portions. The pairs of radial grooves 6, 6' are arranged in line in the axial direction such that they are disposed on the steps 11, 11' of two winding stairs which cover in each case half the circumference, whereby crossing-over of the mid-portions of the coiled wires in the frontal area of the inventive mixing and whipping whisk is rendered possible even if the coiled wires all together have the same shape and size. Correspondingly, likewise the end surface of the clamping element 3 projecting into the indentation 4 of the mounting head 2' is of stepped arrangement so that, when the clamping element 3 is inserted into the indentation 4 of the mounting head 2', each step 12, 12' of the clamping element will move to bear against each step 11, 11' of the mounting head. To reliably fix the clamping element in the indentation of the mounting head by positive engagement, the indentation is furnished with a circumferential annular groove 7 and the clamping element is provided with a corresponding annular bead 8. As an assembling aid, a guide pin 9 is arranged concentrically in the opening 4, a mating recess 10 in the clamping element 3 being allocated thereto.

We claim:

1. Mixing and whipping whisk for electric mixing machines and hand mixers which is composed of a shaft adapted to be coupled with the motor drive and of at least two crossing coiled wires, each said wire having free end portions which are secured by clamping engagement in recesses of a mounting head secured to said shaft, characterized in that said mounting head comprises an indentation that is concentric relative to the shaft axis, in the wall of which indentation there are shaped longitudinal grooves arranged in pairs opposite to each other and extending in the axial direction, into which longitudinal grooves said free end portions of said coiled wires are inserted, and a plug-shaped clamping element which comnforms to said indentation secured in said indentation in a self-clamping manner, the said end portions being radially outwardly pressed into the grooves and being clamped therein by means of said plug-shaped clamping element.

2. Mixing and whipping whisk as claimed in claim 1, characterized in that the longitudinal grooves (5, 5') terminate into radial grooves (6, 6') and in that the end portions (13, 13') of the coiled wires (1) have roughly rectangular extensions (14, 14') which, by means of the plug-shaped clamping element (3), are pressed into the radial grooves (6, 6') in the axial direction.

3. Mixing and whipping whisk as claimed in claim 1, characterized in that the indentation (4) and the clamping element (3) are of cylindrical configuration.

4. Mixing and whipping whisk as claimed in any one of the claims 1 to 3, characterized in that, for the purpose of selfclamping engagement of the plug-shaped clamping element (3) in the indentation (4) of the mounting head (2'), an annular bead (8) is furnished at the periphery of the clamping element (3) and a correspondingly shaped annular groove (7) is provided at the wall of the indentation (4), or vice-versa.

5. Mixing and whipping whisk as claimed in any one of the claims 1 to 3, characterized in that all coiled wires (1) have the same shape and size and are each fixed in diametral grooves (5, 5'; 6, 6').

6. Mixing and whipping whisk as claimed in any one of the claims 1 to 3, characterized in that the bottom of the indentation (4) and, correspondingly, the end surface of the clamping element (3) projecting into the indentation (4) are stepped two times like winding stairs in such a manner that two diametral steps (11, 11'; 12, 12') each are disposed in alignment with one another on the same axial level, the radial grooves (6, 6') being formed into the steps (11, 11') of the indentation (4), with the height of the step corresponding approximately to the thickness of wire of the coiled wires (1).

7. Mixing and whipping whisk as claimed in any one of the claims 1 to 3, characterized in that a guide pin (9) is concentrically arranged in the indentation (4), and a recess (10) conformed to the cross-section of the guide pin (9) is concentrically arranged in the plug-shaped clamping element (3).

8. Mixing and whipping whisk for electric mixing machines and hand mixers comprising a shaft adapted to be coupled with a drive, a mounting head at the end of the shaft remote from the drive end, said mounting head having at one end an indentation that is concentric with the shaft axis, shaped longitudinal grooves arranged in opposed pairs and extending in the axial direction in the wall of said indentation, said longitudinal grooves terminating in radial grooves, at least two crossing coil wires, each said coil wire having end portions and said end portions having roughly rectangular extensions, said end portions being disposed in said longitudinal grooves with said extensions disposed in said radial grooves, and a plug-shaped clamping element which conforms to said indentation and is secured therein in a self-clamping manner, said clamping element pressing said end portions radially outwardly into said longitudinal grooves and pressing said extensions into said radial grooves in the axial direction.

9. Mixing and whipping whisk as claimed in claim 8 wherein said indentation and said clamping element are of cylindrical configuration.

10. Mixing and whipping whisk as claimed in claim 8 wherein the bottom of said indentation and, correspondingly, the end surface of said clamping element projecting into said indentation are stepped two times like winding stairs in such a manner that two diametral steps each are disposed in alignment with one another on the same axial level, said radial grooves being formed in the steps of said indentation, with the height of the step corresponding approximately to the thickness of wire of said coil wires.

11. Mixing and whipping whisk as claimed in claim 8 and further including a guide pin concentrically arranged in said indentation, and a recess corresponding to the cross-section of said guide pin concentrically arranged in said plug-shaped clamping element.

* * * * *